United States Patent [19]

Uchiyama

[11] Patent Number: 4,992,167

[45] Date of Patent: * Feb. 12, 1991

[54] FILTERING APPARATUS

[75] Inventor: Tadao Uchiyama, Funabashi, Japan

[73] Assignee: Syst Corporation, Tokyo, Japan

[*] Notice: The portion of the term of this patent subsequent to Jan. 23, 2007 has been disclaimed.

[21] Appl. No.: 226,847

[22] Filed: Aug. 1, 1988

[30] Foreign Application Priority Data

Nov. 25, 1987 [JP] Japan .............................. 62-296897

[51] Int. Cl.⁵ .............................................. B01D 33/06
[52] U.S. Cl. .................................... 210/171; 210/391; 210/402; 210/407; 210/408
[58] Field of Search .................... 175/66, 206, 207; 210/171, 172, 394, 396, 397, 402–404, 406, 409, 805, 806, 393, 223, 391, 526, 407, 408; 209/294, 293

[56] References Cited

U.S. PATENT DOCUMENTS

| 1,712,258 | 5/1929 | Compain | 210/394 |
| 2,111,843 | 3/1938 | Daman | 210/404 |
| 2,143,842 | 1/1939 | Christian | 210/402 |
| 2,196,793 | 4/1940 | Hall | 210/403 |
| 2,300,166 | 10/1942 | Nowak | 210/402 |
| 4,052,311 | 10/1977 | Martin | 210/223 |
| 4,243,527 | 1/1981 | Leonard | 210/397 |
| 4,368,125 | 1/1983 | Murray | 210/393 |
| 4,370,228 | 1/1983 | Tashiro et al. | 210/223 |
| 4,407,720 | 10/1983 | Bratten | 210/404 |
| 4,622,145 | 11/1986 | Bratten | 210/404 |
| 4,639,258 | 1/1987 | Schellstede et al. | 210/406 |
| 4,724,077 | 2/1988 | Uchiyama | 210/403 |
| 4,747,961 | 5/1988 | Beer et al. | 210/406 |
| 4,895,647 | 1/1990 | Uchiyama | 210/171 |

FOREIGN PATENT DOCUMENTS 2124510 5/1980 United Kingdom ................ 210/403

Primary Examiner—Frank Spear
Assistant Examiner—Joseph Drodge
Attorney, Agent, or Firm—Wenderoth, Lind & Ponack

[57] ABSTRACT

A filtering apparatus for filtering cutting oil containing metal chips so that the filtered cutting oil can be recycled includes a reservoir, a filtering drum journalled within the reservoir and having a filtering screen support and a filtering screen extending about the periphery of the drum and secured to the drum by the filtering screen support, a chip discharge device including a belt entrained around guide rollers for carrying separated metal chips out of the reservoir, a discharged chip receiving bin disposed outside the reservoir adjacent to the discharge end of the chip discharge device and a filtered oil receiving bin disposed outside of the reservoir adjacent to a filtered oil discharge area of the reservoir. The drum is rotated by a motor located atop the reservoir and connected to the drum. An air spray device extends within the drum for spraying air at the filtering screen to dislodge any metal chips clinging to the screen.

6 Claims, 1 Drawing Sheet

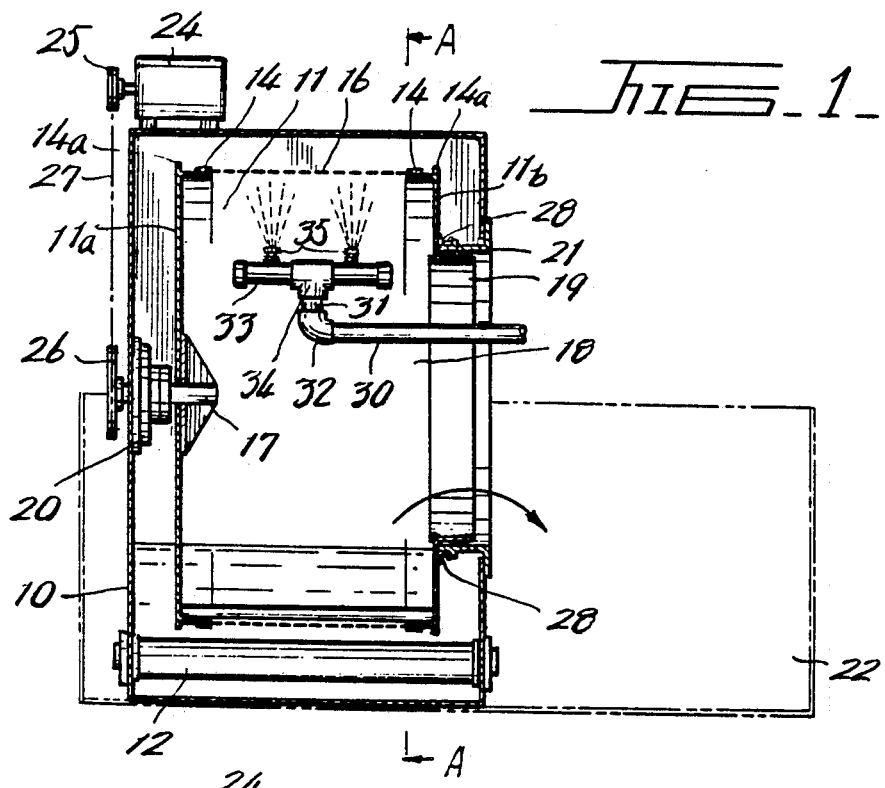
FIG_1_
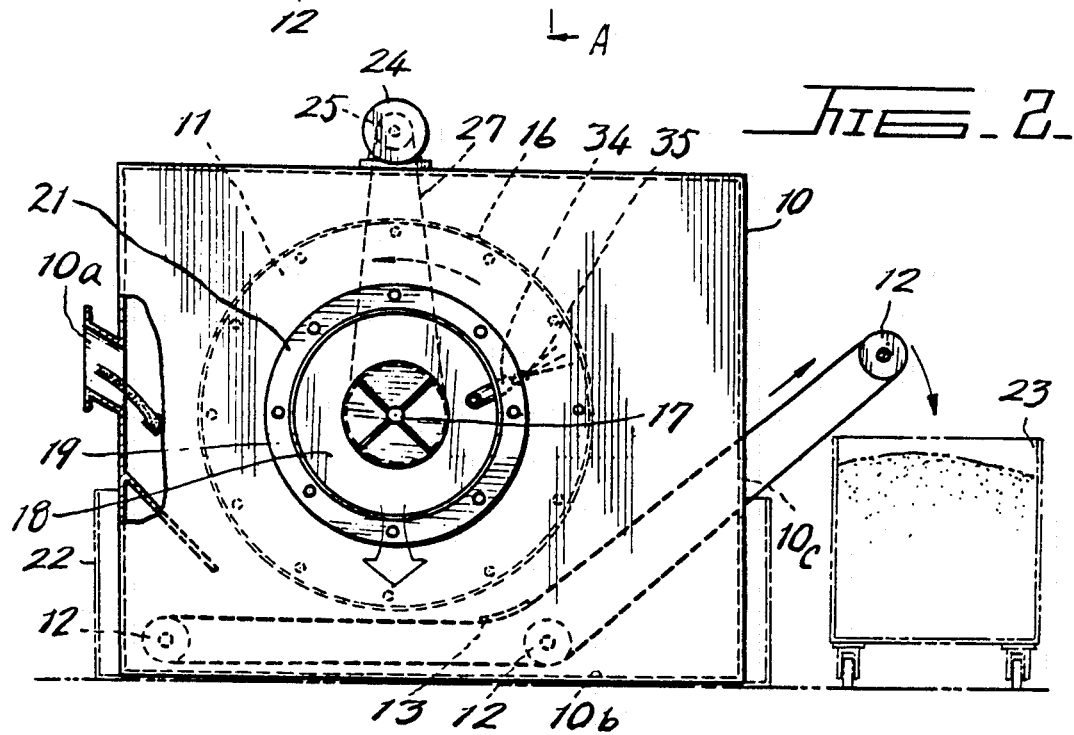
FIG_2_

FILTERING APPARATUS

BACKGROUND OF THE INVENTION

This invention relates to a filtering apparatus for filtering cutting oil containing metal pieces which are referred to as "metal chips" produced during metal cutting operations in a metal working machine.

There have been proposed and practically employed a variety of apparatus for filtering cutting oil containing metal chips; and one type of the prior art filtering apparatus is disclosed in U.S. Pat. Nos. 1,630,274, 2,014,144 and 3,979,289, for example. As shown in these U.S. patents, a filtering drum having a filtering screen extending about the periphery thereof is rotatably mounted within the cutting oil reservoir and during operation, cutting oil containing metal chips is introduced into the filtering drum which separates the oil and chips from each other and the separated metal chips are allowed to settle within the filtering drum to be carried out of the drum whereas the filtered cutting oil is allowed to flow from the drum into the reservoir.

However, the above-mentioned filtering apparatus has the following drawbacks:

In the prior art filtering apparatus, since cutting oil containing metal chips is introduced into the filtering drum, the total weight of the chips and oil is directly applied to the filtering drum. As a result, a specific mechanism for journalling the filtering drum within the oil reservoir has to be provided. In addition, the filtering screen extending about the periphery of the filtering drum should be designed to withstand potential damage from the metal chips contained in the cutting oil.

Furthermore, means for depositing the metal chips separated from the cutting oil within the filtering drum and means for carrying the deposited of metal chips out of the filtering drum should be specially designed.

SUMMARY OF THE INVENTION

Thus, the present invention has a its object to provide a filtering apparatus of the above described type which eliminates the above-mentioned drawbacks inherent in the prior art filtering apparatus referred to hereinabove. According to the present invention, the load to be applied to the bearing journalling the filtering drum within the cutting oil reservoir is comparatively small so that the filtering drum can rotate smoothly, potential damage and/or clogging of the filtering screen as a result of the introduction of cutting oil containing metal chips into the filtering drum can be prevented and the separation of the metal chips from the cutting oil and the discharge of the separated chips from the reservoir can be simply and easily performed.

The above and other objects and attendant advantages of the present invention will be more readily apparent to those skilled in the art from a reading of the following detailed description in conjunction with the accompanying drawings which show one prefered embodiment of the invention for illustrative purposes only, but not for limiting the scope of the same in any way.

BRIEF DESCRIPTION OF THE DRAWINGS

FIG. 1 is a vertical sectional view of the preferred embodiment of the filtering apparatus in accordance with the present invention; and FIG. 2 is a sectional view taken substantially along the line A-A of FIG. 1.

PREFERRED EMBODIMENT OF THE INVENTION

The present invention will be now described referring to the accompanying drawings in which the preferred embodiment of the filtering apparatus of the invention is illustrated. In the drawings, reference numeral 10 denotes a rectangular cutting oil reservoir which has an inlet 10a in one end wall through which cutting oil containing metal chips is introduced into the reservoir 10, a bottom 10b and a metal chip discharge area 10c in the other end wall through which chip discharge means extends as will be described hereinafter. A filtering drum 11 is suitably journalled within the reservoir 10, with a portion thereof immersed in the cutting oil within the resevoir to be rotated by drive means as will be described hereinafter.

The chip discharge means comprises a plurality of spaced transverse guide rollers 12 provided adjacent to and above the bottom 10b of the reservoir 10 except one guide roller which is provided outside of the reservoir 10 at a level higher than the level at which the guide rollers within the reservoir are disposed, and an endless belt 13 trained about the guide rollers 12 to thereby form a chip conveying path which includes a substantially horizontal portion disposed within the reservoir 10 and an inclined portion extending upwardly from one end of the horizontal portion and passing through the discharge area 10c out of the reservoir 10.

The transmission of a driving force from the drive means to the filtering drum 11 may be effected by imparting the driving force to the shaft of the filtering drum or by imparting the driving force to opposing and spaced filtering screen holding-down means 14, 14 on the periphery of the filtering drum 11 adjacent to the opposite side edges thereof. Each holding-down means 14 has a radially outwardly extending flange 14a for prevention of slipping off the belt 13.

The filtering drum 11 journalled in the reservoir 10 further has, in addition to the above-mentioned holding-down means 14, side plates 11a, 11b on the opposite sides of the filtering drum 11 and a filtering screen 16 extending about the periphery of the filtering drum 11 under tension and held down by the screen holding-down means 14.

A bar-shaped rotary shaft 17 is journalled at the center of the side plate 11a, and the other side plate 11b is formed at the central area with a circular opening 18 in which an annular rotary member 19 is disposed. The annular member 19 is secured to the filtering drum for rotation therewith.

The bar-shaped rotary shaft 17 is journalled in a bearing 20 provided in the side wall of the reservoir 10 where the shaft 17 extends whereas the annular rotary member 19 is journalled in an annular bearing 21 provided in the opposite side wall of the reservoir 10 whereby the filtering drum 11 is supported within the reservoir in a floating condition.

A filtered oil receiving bin 22 is disposed outside of the reservoir 10 adjacent to the side wall of the reservoir 10 wherre the bearing 21 is provided so that the filtered oil from the reservoir 10 flows into the bin 22. A pump (not shown) always pumps the filtered cutting oil from the oil bin 22 to a suitable external system (not shown) for reuse.

A chip receiving bin 23 is disposed outside of the reservoir 10 adjacent to one end wall of the reservoir 10 in a position below the upper end of the chip conveying path defined by the guide rollers 12 and the endless belt 13.

A drive motor 24 is provided on the top of the reservoir 10 adjacent to the side wall of the reservoir 10 in which the bearing 20 is provided and has an output shaft projecting beyond the side wall, a pulley 25 is mounted at the outer end of the output shaft, a pulley 26 is mounted at the free outer end of the shaft 17 and an endless belt or chain 27 is trained about the pulleys 25, 26 to thereby provide the drive means for the filtering drum 11.

An annular packing 28 is disposed between the outer surfaces of the side plate 11b and of the bearing 21 to prevent the filtered cutting oil from flowing from the side plate 11b into the reservoir 10 or the cutting oil containing chips therein introduced into the reservoir from flowing from the side plate 11b into the filtering drum 11.

An air spray means extends from outside of the reservoir 10 through the opening 18 into the filtering drum 11 and includes a horizontal tube portion 30, an upright tube portion 31 connected to the tube portion 30 by an elbow joint 32, a second horizontal tube portion 33 connected to the upright tube portion 31 by a joint 34 and nozzles 35 through which air is sprayed under pressure against the inner surface of the filtering screen 16 to dislodge chips which may deposite on the screen. The outer end of the air spray means is connected to an external air supply source (not shown).

In operation, cutting oil containing metal chips is introduced into the reservoir 10 through the inlet 10a and the drive means is operated to impart a driving force to the filtering drum 11 to rotate the drum. Simultaneously, the chip discharge means is operated and the pump (not shown) is also turned on.

Thus, the filtering drum 11 within the reservoir 10 rotates with a portion of the drum, and more particularly, a portion of the filtering screen 16 thereon, immersed in the cutting oil containing metal chips in the reservoir 10 to separate the oil and chips from each other. The cutting oil having the metal chips removed therefrom flows into the filtering drum through the filtering screen 16 as filtered cutting oil. Since the filtering drum 11 is rotating, the possibility of the clogging of the filtering screen 16 with the separated metal chips can be minimized. However, if and when the screen 16 is clogged with the metal chips, the air spray means is turned on to spray air under pressure against the inner surface of the filtering screen 16 to dislodge the deposition of metal chips from the screen. After the separation of the metal chips and the cutting oil, the filtered oil flows through the opening 18 along the rotary annular member 19 and the bearing 21 into the bin 22. The filtered oil in the bin 23 is pumped out of the bin by the pump (not shown) to the external system for reuse. On the other hand, the metal chips separated from the cutting oil settle on the bottom 10b of the reservoir 10 where the conveying means passes to entrain the chips thereon so as to carry the chips out of the reservoir through the opening 10c and into the bin 23.

Since, the filtering apparatus of the present invention has the structure and operates as described hereinabove, the present invention can eliminate possible damage and/or clogging of the filtering screen as a result of the introduction of cutting oil containing metal chips into the filtering drum as experienced with the prior art filtering apparatus employing the filtering drum. Further, according to the present invention, any specific mechanism for transferring chips from the filtering drum onto the conveying means and for alleviating load to be applied to the filtering drum when cutting oil containing metal chips is introduced into the filtering drum is not required. Rather, since the introduction of metal chips into the filtering drum in principle causes the filtering drum to float in the reservoir, load to be applied to the bearing supporting the rotary shaft of the filtering drum is reduced and as a result, the filtering drum can rotate smoothly.

While the present invention has been particularly shown and described with reference to the preferred embodiment thereof, it will be understood by those skilled in the art that various changes in form and details may be made therein without departing from the spirit and scope of the invention.

What is claimed is:

1. A filtering apparatus for filtering cutting oil containing metal chips, said apparatus comprising:
    an oil reservoir having a rectangular cross section, opposed end walls, one of which end walls has an oil inlet extending therethrough and through which oil inlet cutting oil is introduced into the reservoir and the other of which end walls has a chip discharge opening extending therethrough and through which chip discharge opening metal chips are discharged out of the reservoir, opposed side walls extending between said end walls and one of which side walls has an oil discharge opening extending therethrough, and a bottom wall extending between said end walls;
    a filtering drum rotatably mounted within said reservoir,
    said drum comprising a filtering screen extending about the periphery thereof for filtering cutting oil containing metal chips;
    an annular rotary member secured to said drum so as to rotate therewith, said annular rotary member journalled in said discharge opening;
    a rotary shaft journalled in the other of said side walls and rotatably supporting said drum with said annular rotary member;
    drive means operatively connected to said shaft for rotating said shaft to rotate said drum; and
    chip discharge means disposed in said reservoir and extending through said chip discharge opening for discharging metal chips disposed adjacent said bottom wall of said reservoir from said reservoir through said chip discharge opening.

2. A filtering apparatus as claimed in claim 1, wherein said drive means comprises a motor disposed on the outer surface of said reservoir and having an output shaft, a first sprocket connected to said output shaft, a second sprocket disposed outside said reservoir and connected to said rotary shaft, and chain extending around said sprockets.

3. A filtering apparatus as claimed in claim 1, wherein said chip discharge means is a conveyor comprising a belt having upper and lower runs extending between said filtering drum and the bottom wall of said reservoir and through said chip discharge opening, and a plurality of guide rollers around which said belt is reeved,
    at least some of said guide rollers disposed in said reservoir and extending between and journalled to the side walls of said reservoir.

4. A filtering apparatus as claimed in claim 1, and further comprising a filtered oil bin disposed outside of said reservoir in communication with said oil discharge opening for receiving filtered oil pouring out from said discharge opening.

5. A filtering apparatus as claimed in claim 4, and further comprising air spraying means extending within said drum for directing a spray of air at said filtering screen that impinges said screen at a location thereon defined above a top end of said oil bin.

6. A filtering apparatus as claimed in claim 1, and further comprising air spraying means extending within said drum for directing a spray of air at said filtering screen that impinges said screen at a location thereon defined at least at the same level with said oil inlet.

* * * * *